Dec. 2, 1941.   A. C. GARY   2,264,690
PARKING MIRROR FOR AUTOMOBILES
Filed Dec. 21, 1939   3 Sheets-Sheet 1

INVENTOR
Alvin C. Gary
BY C. James Cottrell
ATTORNEY

Dec. 2, 1941.　　　　　A. C. GARY　　　　　2,264,690
PARKING MIRROR FOR AUTOMOBILES
Filed Dec. 21, 1939　　　　3 Sheets-Sheet 2

INVENTOR
Alvin C. Gary
BY
James Cottrell
ATTORNEY

Dec. 2, 1941.   A. C. GARY   2,264,690
PARKING MIRROR FOR AUTOMOBILES
Filed Dec. 21, 1939    3 Sheets-Sheet 3
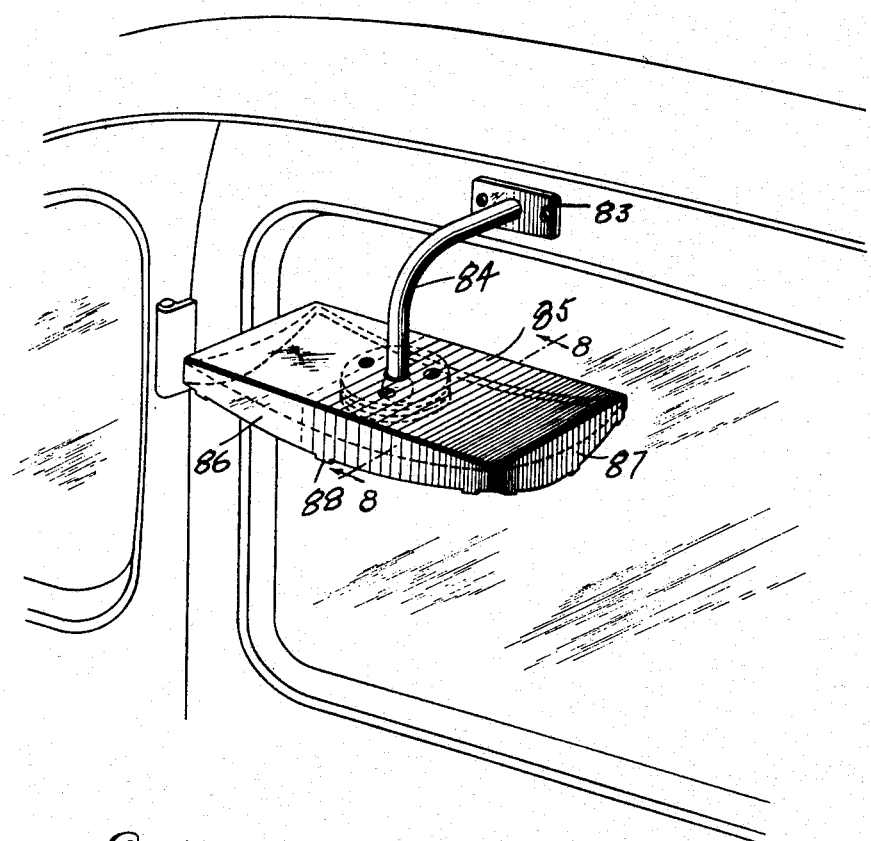
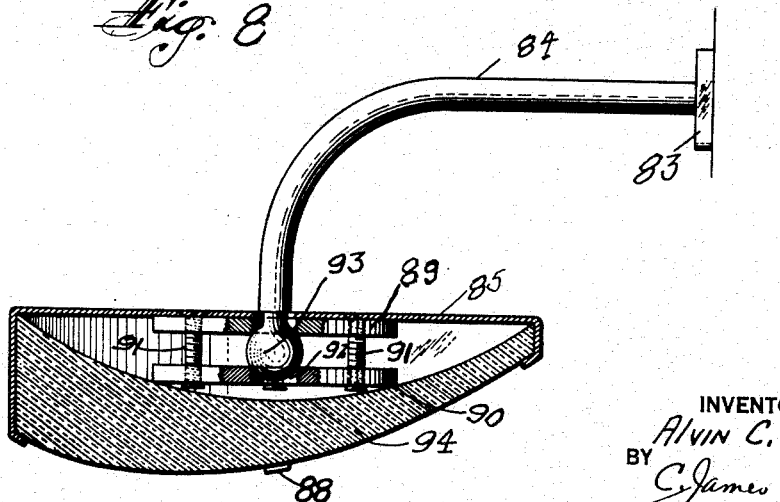
INVENTOR
Alvin C. Gary
BY James Cottrell
ATTORNEY

UNITED STATES PATENT OFFICE 2,264,690

PARKING MIRROR FOR AUTOMOBILES

Alvin C. Gary, Brooklyn, N. Y.

Application December 21, 1939, Serial No. 310,364

3 Claims. (Cl. 88—93)

This invention relates to automobile accessories and more particularly to a device to aid in the parking of automobiles.

It is a custom at present to place the driver's seat on the left-hand side of the automobile, which places the driver at a disadvantage when parking on the right hand side of the street, as he is unable to see the curb. Devices have been provided to indicate the relative position of the car with respect to adjacent objects, but such devices have been inadequate as they do not give the driver an exact idea of the position of the curb. It has been attempted to solve this problem by providing a plurality of mirrors by means of which the driver could determine the position of the curb; but such plurality of mirrors required careful adjustment which could not be maintained due to the vibrations of the car when in motion.

It is, therefore, an object of this invention to provide a device to assist in the parking of an automobile, which device includes a single mirror of a peculiar shape which will give the driver a clear and accurate view of the curb on the right hand side of the street.

A further object is the provision of a mirror made from a meniscus lens which can be simply adjusted to enable the driver on the left hand side of the automobile to view in detail the curb and adjacent articles on the right hand side of the automobile.

Figure 1:
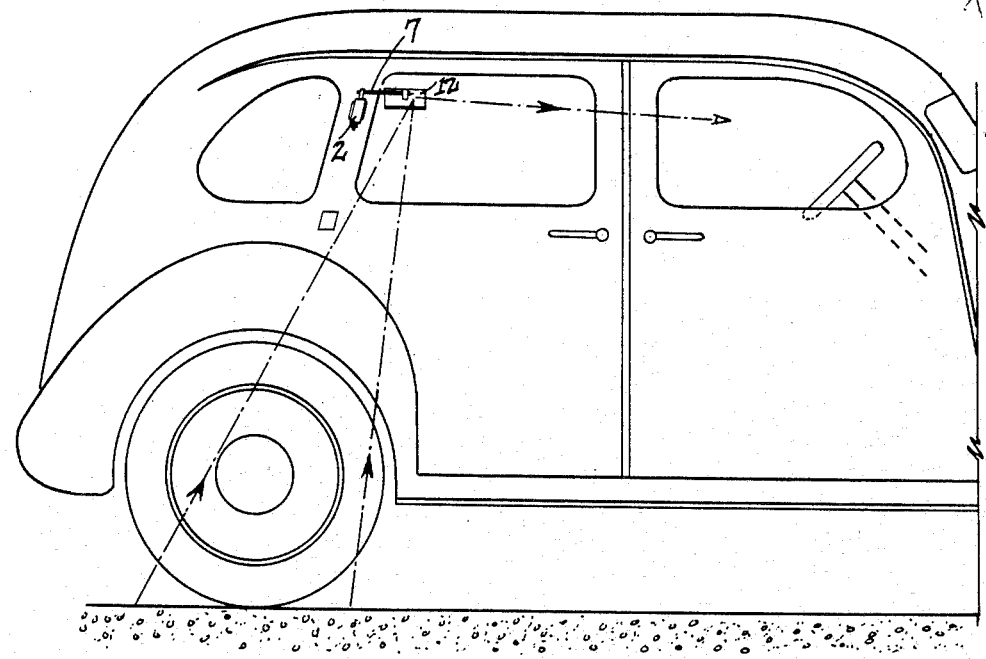
Figure 2:
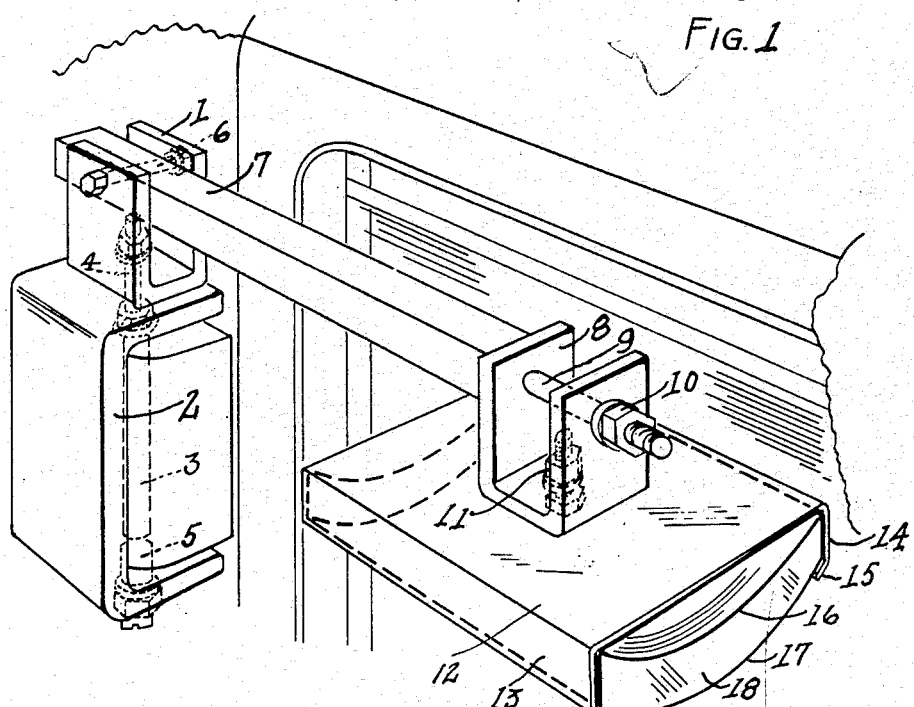
Figure 3:
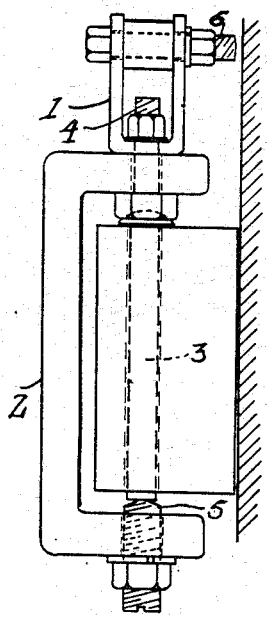
Figure 4:
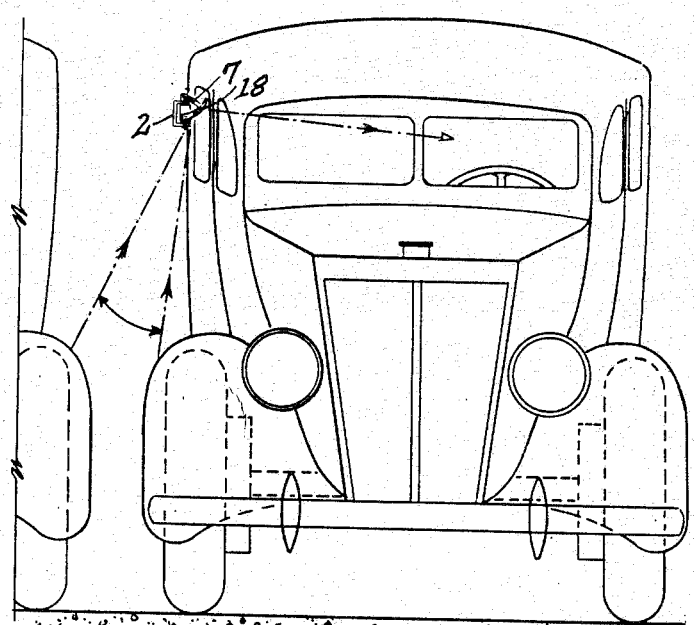
Figure 5:
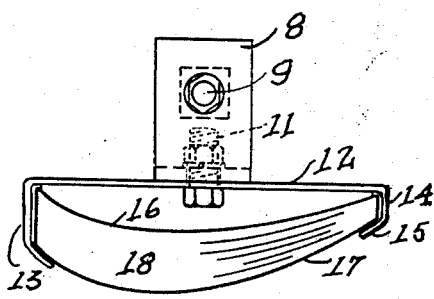
Figure 6:
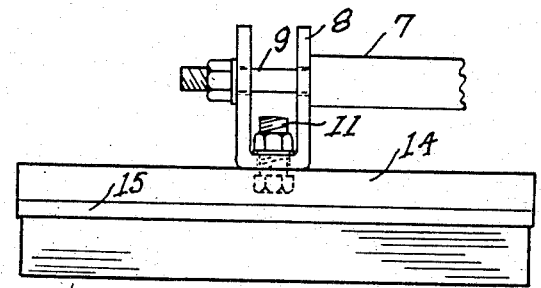

These and other advantageous objects, which will later appear, are accomplished by the simple and practical construction and arrangement of parts hereinafter described and exhibited in the accompanying drawings, forming part hereof, and in which:

Fig. 1 is a side view of an automobile having my device applied to the right side thereof, Fig. 2 is a perspective view of the device applied to a car, Fig. 3 is an end view of means for attaching the device to the hinge of an automobile door, Fig. 4 is a front view of an automobile with the device attached thereto, Fig. 5 is an end view of the reflecting mirror, Fig. 6 is a side view of the mirror and support, Fig. 7 is a perspective view of a modified form of the invention, Fig. 8 is a sectional view taken on line 8—8 of Fig. 7.

Referring to the drawings, in Fig. 2, the device is shown to comprise a U-shaped member 1, which is mounted on a bracket 2, which is U-shaped and has the legs thereof positioned over the ends of the hinge pin 3 of an automobile door. The member 1 is secured to member 2 by the bolt and nut arrangement shown at 4, and the member 2 is clamped to the hinge pin 3 by the bolt and nut arrangement shown at 5, which clamping means are common and well known in the art.

Passing through the side walls of member 1 is a pin 6, which supports a bar 7, which has a reduced portion 9, cylindrical in shape, passing through the walls of a U-shaped member 8, which is pivotally mounted on the rod 9, and clamped tightly in an adjusted position by a nut 10.

Secured to the underside of member 8 by a threaded stud and bolt 11 is a plate 12 having a downturned flange 13, which is turned inwardly at its edge.

The plate 12 is provided on the other side thereof with a similar downturned flange 14, having its edge 15 turned inwardly in a similar manner. Positioned between the flanges 13 and 14 is a lens 18 of the meniscus type, which has an upper curved surface 16 and a lower curved surface 17. The curvature of surface 17 is greater than the curvature of surface 16, which is silvered or otherwise treated to provide a mirror or reflecting medium.

In operation, the mirror is adjusted so that surface 17 faces the ground in the manner shown in Fig. 5. The edge of the mirror nearest the side of the automobile is of less width than the edge embraced by flange 13, both edges being flat. When the mirror is adjusted to the proper angle, the driver of the automobile is able to conveniently and accurately view the ground and objects adjacent the right hand side of the automobile. In parking on the right side of the street, this is of great advantage, as the hoods of automobiles are now constructed of such a size and shape that it is only by guessing or skill that a driver can properly park an automobile close to the curb of a street.

From the above description, it will be seen that there has been provided a simple device for aiding in parking an automobile, which comprises a single mirror capable of being readily and conveniently adjusted to properly reflect images of objects on the right hand side of an automobile.

While the mirror has been described above as being of the meniscus type, effective results have been obtained with spherical mirrors. A spherical mirror would be mounted in substantially the same manner as described in connection with the meniscus lens, the angle of the mirror being adjusted to meet the requirements of the particular driver.

It is desirable that parallel lines be etched on the face of the mirror to define an area in which the driver should confine his vision, thus insuring accurate parking.

In Figs. 7 and 8 is shown a modified form of the invention in which a plate 83 is attached to a door above the window. Fixed to plate 83 is a bent rod 84 which passes through the plate 85, which has side walls 86 and end walls 87 with tabs 88 to hold a meniscus mirror 94. Beneath the plate 85 is a plate 89 which cooperates with a lower plate 90 upon which rests a sphere 93 positioned in an opening 92 in plate 90. The sphere 93 is attached to rod 84. The plates can be drawn towards each other by screws 91 which are threaded into plate 90 and pass freely through plate 89.

By means of this arrangement the mirror can be adjusted to any desired angle and maintained in the adjusted position by drawing the plates 89 and 90 towards each other. This form of the invention is adapted to be mounted in any position on an automobile.

The foregoing disclosure is to be regarded as descriptive and illustrative only, and not as restrictive or limitative of the invention, of which, obviously, embodiments may be constructed, without departing from the spirit and scope of the invention herein set forth in the appended claims.

Having thus described the invention, what is claimed is:

1. In a motor vehicle, a device to aid in the parking of a vehicle, comprising a lens having a curved upper surface and a curved lower surface, said surfaces being curved in the same direction and the curvature of the upper surface being less than the curvature of the lower surface, one end of the lens being of greater thickness than the other opposite end, the upper surface being treated to cause the lens to act as a mirror, and means to mount the lens on the outside of the vehicle on the side opposite and in rear of the driver's seat so that the end of the lens of less thickness will be inclined upwardly and towards the driver's seat and the upper portion of the lower surface will be visible from the driver's seat.

2. In a motor vehicle, a device to aid in the parking of an automobile, comprising a lens mounted on the outside of the motor vehicle on the side opposite and in rear of the driver's seat and visible from the driver's seat, said lens having a curved upper surface and a curved lower surface, said surfaces being curved in the same direction and the curvature of the upper surface being less than the curvature of the lower surface, means on the upper surface to cause the lens to act as a mirror, said lens being inclined so that the lower surface thereof is directed towards the driver's seat and lower portions of the automobile.

3. In a motor vehicle, a device to aid in the parking of an automobile, comprising a cylindrical lens mounted on the outside of the motor vehicle on the side opposite and in rear of the driver's seat and visible from the driver's seat, said lens having a curved upper surface and a curved lower surface, said surfaces being curved in the same direction and the curvature of the upper surface being less than the curvature of the lower surface, said lens having one edge of greater thickness than the opposite edge, said lens being inclined so that the lower surface thereof is directed towards the driver's seat and lower portions of the automobile with the edge of less thickness directed towards the upper portion of the automobile, and means on the upper surface to cause the lens to act as a mirror.

ALVIN C. GARY.